US008649923B2

(12) United States Patent
Sankaran et al.

(10) Patent No.: US 8,649,923 B2
(45) Date of Patent: Feb. 11, 2014

(54) E-DRIVE PWM FREQUENCY STRATEGY (75) Inventors: Venkateswa Sankaran, Farmington Hills, MI (US); Joe Xiang, Conton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 540 days.

(21) Appl. No.: 12/686,355

(22) Filed: Jan. 12, 2010

(65) Prior Publication Data
US 2011/0172859 A1  Jul. 14, 2011

(51) Int. Cl.
B60L 9/18 (2006.01)
(52) U.S. Cl.
USPC ............... 701/22; 180/65.285; 318/400.23; 318/400.2; 318/599; 318/811; 318/819
(58) Field of Classification Search
USPC ........ 701/22; 180/65.285; 318/810, 811, 245, 318/587, 139, 400.23, 400.2, 599; 323/351
See application file for complete search history.

(56) References Cited

U.S. PATENT DOCUMENTS

| 5,880,574 | A | 3/1999 | Otsuka et al. |
| 6,724,166 | B2 * | 4/2004 | Narumi et al. ............ 318/400.23 |
| 7,923,961 | B2 * | 4/2011 | Takamatsu et al. ............ 318/811 |
| 2006/0113798 | A1 * | 6/2006 | Oyobe et al. ........................ 290/7 |
| 2007/0114965 | A1 * | 5/2007 | Kutsuna et al. ............... 318/807 |
| 2007/0175429 | A1 * | 8/2007 | Yanagida et al. ........ 123/179.14 |
| 2007/0210766 | A1 | 9/2007 | Borowy et al. |
| 2008/0298785 | A1 | 12/2008 | Patel et al. |
| 2009/0115362 | A1 | 5/2009 | Saha et al. |
| 2010/0270955 | A1 * | 10/2010 | Yamakawa et al. ............ 318/139 |
| 2011/0166736 | A1 * | 7/2011 | Kitanaka ......................... 701/22 |
| 2011/0231040 | A1 * | 9/2011 | Schulz et al. ................... 701/22 |

FOREIGN PATENT DOCUMENTS

| JP | 6-38301 A | * | 2/1994 |
| JP | 8163701 | | 6/1996 |
| JP | 9-28004 A | * | 1/1997 |
| JP | 10327597 A | | 12/1998 |
| JP | 2002-153096 A | * | 5/2002 |
| JP | 2004-48844 A | * | 2/2004 |
| JP | 2006-130614 A | * | 5/2005 |
| JP | 2006-333572 A | * | 12/2006 |
| JP | 2006-333672 A | * | 12/2006 |
| JP | 2009-214784 A | * | 9/2009 |
| WO | WO2004073156 | | 8/2004 |
| WO | WO 2007/148521 A1 | * | 12/2007 |

* cited by examiner

Primary Examiner — Ruth Ilan
(74) Attorney, Agent, or Firm — David Kelley; Maristyn Law LLC (57) ABSTRACT A pulse width modulation (PWM) Frequency Adaptation Mechanism (PFAM) is configured to receive vehicle state input, and in response to the vehicle state input, provide a PWM parameter for PWM switching of electronics in a power conversion circuit of an electric drive system (EDS) for a hybrid electric vehicle. In one example, a PWM parameter that reduces the audible noise generated by PWM switching can be designated by the PFAM. A PFAM can be configured to receive user input regarding user preference for a default mode or a noise reduction mode. Vehicle state input can include input related to vehicle motion, climate control system state, engine state, EDS state, vehicle body state and audio system state. By way of example, a PWM noise reduction parameter can comprise a high PWM switching frequency, or a random frequency hopping about a low PWM switching frequency.

20 Claims, 8 Drawing Sheets

E-DRIVE PWM FREQUENCY STRATEGY

BACKGROUND OF INVENTION

1. Field of Invention

The present invention relates to electric drive systems. In particular, the invention pertains to pulse width modulation (PWM) strategies employed at an electric drive system.

2. Background Art

Electric machines, in particular electric or hybrid electric vehicles, may employ electrical energy for propulsion via an electric drive system. An electric drive system can encompass a number of components, typically including at least a power circuit and a motor. In this arrangement, the power circuit can controllably transfer power from a power source to the motor to drive a load. Power circuits for electric drive systems designed for electric or hybrid electric vehicles often include inverters for providing three-phase voltage waves from a dc voltage source. Typically an inverter is composed of a plurality of electronic switches that are controllably turned off and on in various combinations to provide desired inverter output voltages. It is common practice to use pulse width modulation (PWM) techniques to turn the switches on and off. The rate at which the switches are turned on and off is typically determined by motor speed or torque requirements as well as fuel efficiency considerations. Unfortunately, in many cases, switching the various electronic devices on and off at a particular frequency can generate noise audible to the vehicle driver, as well as his passengers. The noise can be distracting and irritating, and is often the subject of consumer complaints.

Various attempts have been made to reduce or eliminate irritating PWM switching noise at an electric vehicle. For example, PWM switching can be performed at a higher frequency, such as 10 kHZ, which is outside the human audible range. However, this solution has its disadvantages. While the higher switching frequency no longer generates noise heard by the operator, it induces power losses in the system that can reduce fuel economy, a long-standing priority for hybrid vehicles, and increase power circuit costs.

SUMMARY OF INVENTION

In an exemplary embodiment, a pulse width modulation (PWM) Frequency Adaptation Mechanism (PFAM) is included in an electric drive system (EDS) of an electric or hybrid electric vehicle. An example system of the invention can include a PFAM configured to receive vehicle state input and user preference input and designate one or more PWM parameters in response to the received input, and a user input means configured to receive user input and provide the user input to the PFAM. In an example embodiment, a system can also include a microprocessor, microcomputer, microcontroller, or other processing device configured to interact with said PFAM. For example, a PFAM can be in the form of a software module that can be installed at and executed by a microprocessor at a vehicle. An example system can further include a power conversion circuit configured to provide an output voltage using electronic devices that are switched on or off by pulse width modulation characterized by the one or more PWM parameters specified by the PFAM. In at least one embodiment, an example system can include a vehicle control system configured to provide vehicle state information to the PFAM.

An example method includes receiving vehicle state input, and designating at least one PWM parameter in response to the received input. Vehicle state input can comprise input pertaining to a current status of one or more vehicle systems or components. For example, vehicle state input can comprise vehicle motion status, audio system status, window status, engine status, ventilation system status, as well as status information for other components or systems at the vehicle. A PWM parameter can comprise a PWM switching frequency and/or strategy, such as fixed frequency or random frequency. In at least one example embodiment, a PWM parameter can comprise a PWM strategy. In an example embodiment a PWM strategy can be selected from options that include continuous PWM, discontinuous PWM and random PWM. The invention departs from the conventional practice of using motor speed or motor torque requirements to determine PWM switching frequency, and instead uses vehicle state information to select one or more PWM parameters. In an exemplary embodiment, a PWM parameter is specified that reduces PWM-related noise in accordance with user preferences.

An example method comprises receiving vehicle motion input, receiving engine state input, receiving ventilation system state input, receiving audio system state input, receiving vehicle body state input, and selecting a PWM parameter in response to the received input. An example method can further comprise receiving user preference input. In an example embodiment, a PWM switching frequency can comprise a high frequency beyond the human audible range, or a low frequency within the human audible range. In an exemplary embodiment, when vehicle state input indicates the presence of one or more noise sources, a PWM parameter comprises a default lower PWM switching frequency, and conversely, when vehicle state input indicates the absence of alternative noise sources, a PWM parameter can comprise a PWM frequency higher than the default frequency so that audible PWM noise can be reduced. However, PWM noise can be reduced even when employing a low PWM frequency by specifying a particular low frequency PWM strategy.

An example PFAM apparatus of the invention is configured to receive vehicle state input, and designate a PWM parameter based on the received input. In an example embodiment, a PFAM can be in the form of a software module installed at a microprocessor or other computing device of a vehicle. Execution of the software implements an algorithm that uses received input to determine a PWM strategy and/or select a PWM frequency to be used in the power conversion circuit of the vehicle. In at least one example embodiment, a PFAM can be in the form of a module that can be installed at an inverter system control (ISO) controller of an HEV, where the ISO controller controls operation of an ISO that provides a voltage to a motor. ISO circuit elements can be switched on and off through pulse width modulation characterized by the specified PWM parameter. In at least one example embodiment, an ISO PFAM (IPFAM) module is installed at an ISC controller, and a vehicle control system (VCS) PFAM (VPFAM) module is installed at a VCS controller of a vehicle, the IPFAM and VPFAM modules configured to interact with each other to provide at least one PWM parameter for the electric drive system of a vehicle.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. For example, control modules for various systems can be variously arranged and/or combined, and are not to be considered limited to the example configurations presented herein.

Figure 1:
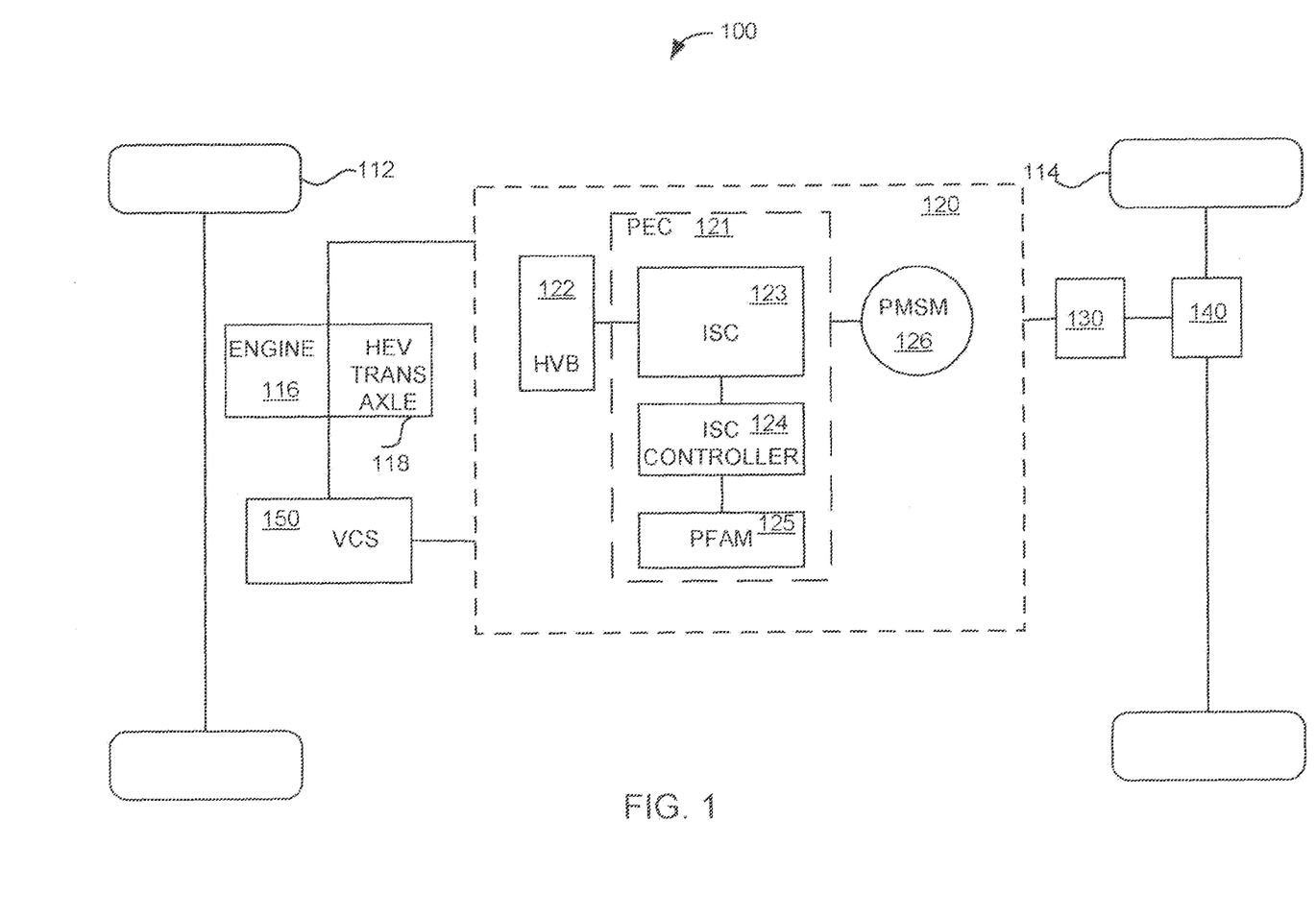
FIG. 1 is a schematic of a vehicle equipped with a PWM Frequency Adaptation Mechanism (PFAM).

FIG. 1 illustrates a schematic of an example vehicle 100. The vehicle 100 may be of any suitable type, such as an electric or hybrid electric vehicle. In at least one embodiment, the vehicle 100 may include a first wheel set 112, a second wheel set 114, an engine 116, an HEV transaxle 118, an electric drive system (EDS) 120, a power transfer unit 130, a differential 140, and a vehicle control system (VCS) 150.

The EDS 120 may be configured to provide torque to the first and/or second wheel sets 112, 114. For example, the EDS 120 may include a high voltage battery (HVB) 122 and a power electronics converter (PEC) 121 coupled to one or more Permanent Magnet Synchronous Machines (PMSM) 126. The PMSM 126 can be coupled to the power transfer unit 130 or HEV Transaxle 118, which in turn can be coupled to the differential 140 to control the wheel set 114. It is contemplated that the PMSM 126 can function as a motor, converting electrical energy to kinetic energy, or as a generator, converting kinetic energy to electrical energy.

The power transfer unit 130 may be selectively coupled to at least one PMSM 126. The power transfer unit 130 may be of any suitable type, such as a multi-gear "step ratio" transmission, continuously variable transmission, or an electronic converterless transmission as is known by those skilled in the art. The power transfer unit 130 may be adapted to drive one or more vehicle wheels. In the embodiment shown in FIG. 1, the power transfer unit 130 is connected to a differential 140 in any suitable manner, such as with a driveshaft or other mechanical device.

In an example embodiment, the PEC 121 includes an inverter system control (ISC) 123 comprising hardware, including inverter circuitry, configured to provide power to the PMSM 126. An ISC controller 124 can be coupled to the ISC 123. The ISC controller 124 can be a microprocessor-based device configured to control operation of the ISC 123, and comprise hardware, software, firmware or some combination thereof. In an example embodiment, currents and voltages of the ISC 123 can be controlled by controllably switching ISC circuit elements using pulse width modulation.

Figure 2:
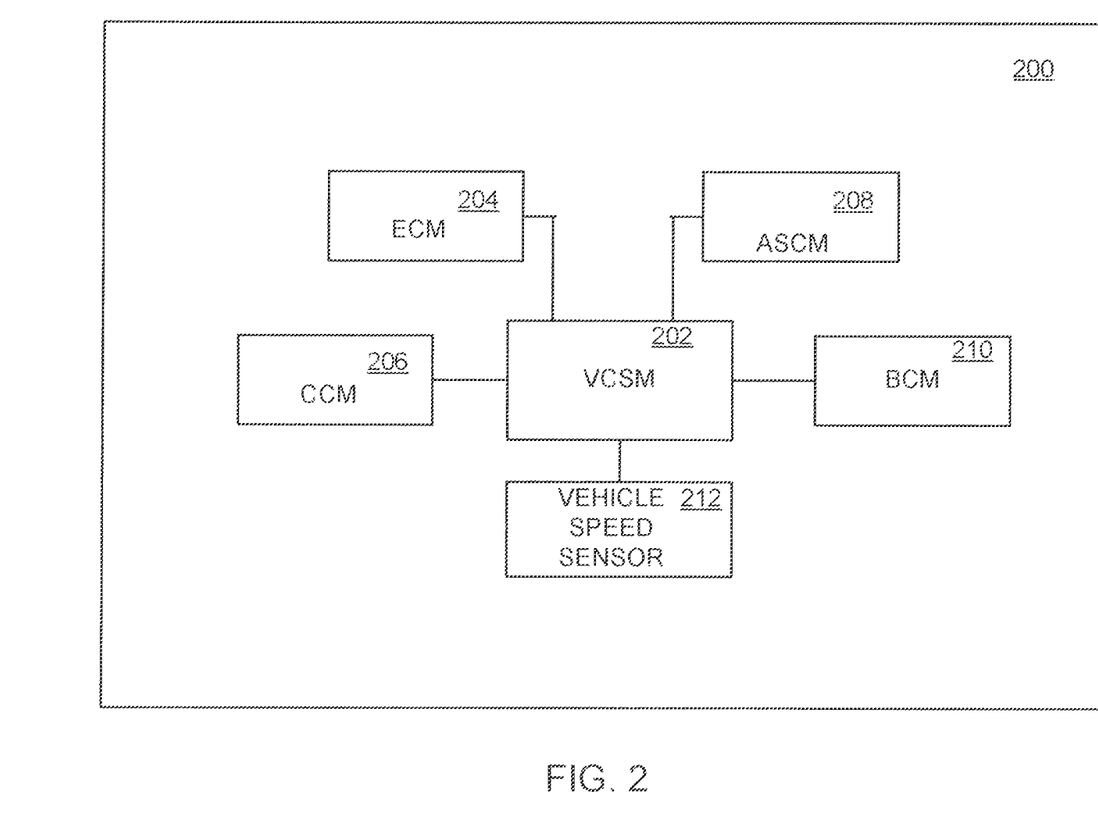
FIG. 2 is a block diagram of an example vehicle control system.

The ISC controller 124 may be electrically coupled to the Vehicle Control System (VCS) 150 which is configured to monitor and/or control various aspects of the vehicle 100. The VCS 150 can comprise a VCS controller communicatively coupled to one or more control modules for one or more various systems installed at a vehicle, and/or to sensors associated with various vehicle systems, and/or to various vehicle components or sensors. FIG. 2 provides an example embodiment 200 of a VCS. The VCS 200 includes a VCS controller in the form of a VCS control module (VCSM) 202, coupled to an engine control module (ECM) 204 for providing engine control and monitoring engine state, a climate control module (CCM) 204 for controlling vehicle interior temperature and ventilation system state, an audio system control module (ASCM) 206 for controlling and/or monitoring audio system operation, and a body control module (BCM) 210 for controlling and/or monitoring aspects of the vehicle body, such as, but not limited to window operation and state. The VCSM 202 can also be communicatively coupled to one or more sensors, such as vehicle speed sensor 212.

In an example embodiment, the VCSM 202 can be in the form of a microprocessor or microcontroller configured to communicate with the various control modules depicted in FIG. 2, as well as other control modules or sensors not shown. The group of control modules depicted in FIG. 2 is not exhaustive, but rather is focused on the components most pertinent for teaching the invention. For example, a VCS can also include a transaxle control module for controlling torque provided to vehicle traction wheels, high voltage battery control module for controlling operation of a high voltage battery, a traction battery control module for monitoring environmental attributes such as temperature, and controlling one or more power sources, a powertrain control module, and other modules associated with various other vehicle systems. Further, it is contemplated that one or more systems, by way of example but not limitation, a vehicle audio system, may not be controlled by a specific module or controller, in which case a VCSM or VCS controller may receive system state input via a sensor or direct connection with a system component. It is noted that functions associated with the control modules and/or sensors depicted in FIG. 2 can be variably combined and/or performed at other vehicle modules or components.

As shown in the example system 100, a PWM Frequency Adjustment Mechanism (PFAM) 125 can be coupled to the ISC controller 124 and the VCS 150. The PFAM 125 can be configured to receive vehicle state input obtained by the VCS 150, and determine at least one PWM parameter in response to the received input. In an example embodiment, the PFAM 125 can provide the at least one PWM parameter to the ISC controller 124, so that the ISC 123 can operate under the PFAM 125-designated PWM parameters. The PFAM 125 can comprise hardware, software, firmware, or some combination thereof, and can be embodied as a stand alone unit, or as a module incorporated or integrated within an existing vehicular component, such as a microprocessor devide.

Figure 3A:
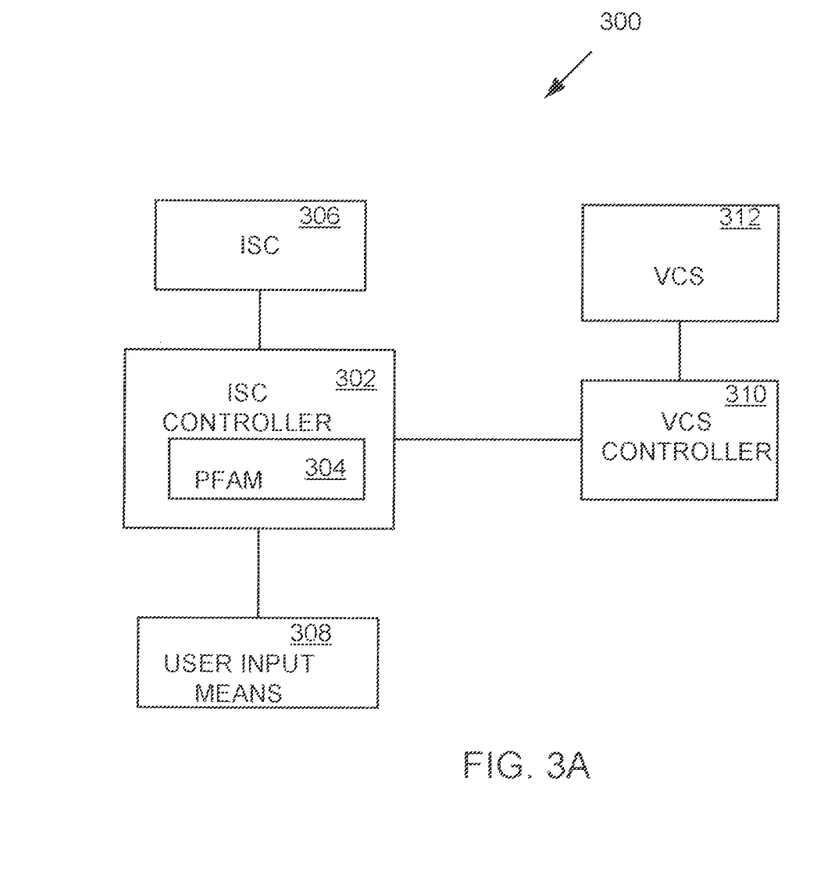
FIG. 3A shows a block diagram of an example embodiment.

FIG. 3A depicts an example embodiment 300 that includes a PFAM 304 installed at an ISC controller 302. In an example embodiment, the PFAM 304 is in the form of a software module installed and executable at the ISC controller 302. The ISC controller 302 is configured to control operation of the ISC 306. A user input means 308 is coupled to the PFAM 304 and configured to receive operator preferences. For example, some vehicle operators may prefer a noise reduction mode in which designated PWM frequency and strategy reduces PWM switching noise. Other operators may prefer a default operational mode in which PWM parameters are selected without consideration of PWM noise. In an example embodiment, the user input means 308 can be embodied as a button or switch on a vehicle dashboard, preferably easily accessible by the vehicle driver, that can be depressed by a user to indicate that noise reduction is desired. In an example embodiment, the user input means 308 is configured to receive user preference input and provide it to the PFAM 304.

Figure 3B:
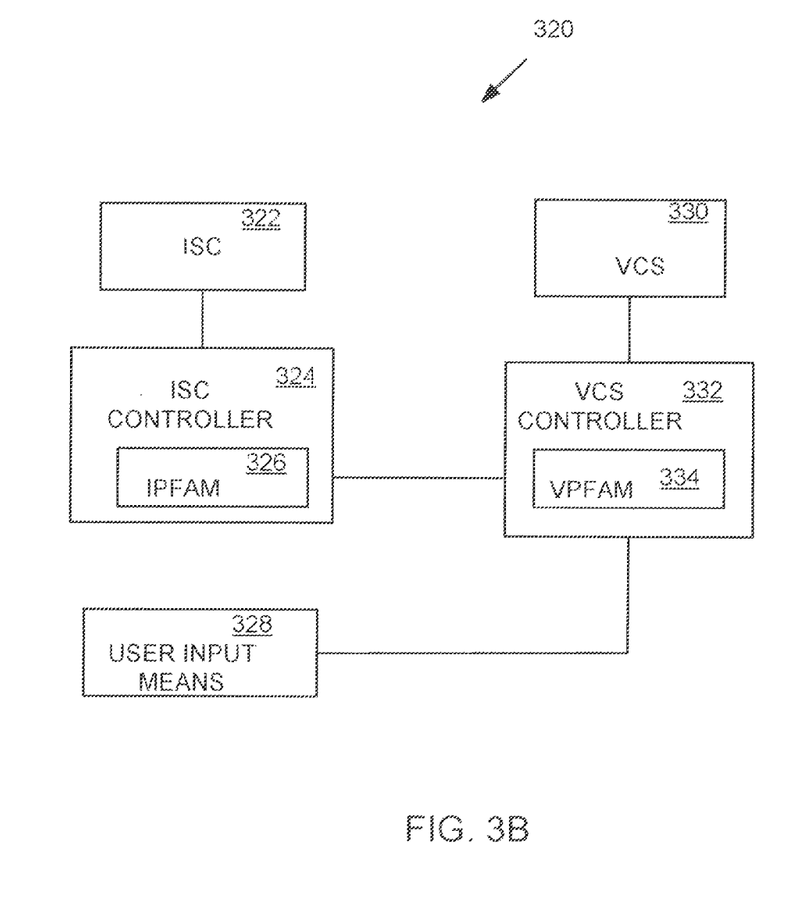
FIG. 3B depicts a block diagram of an example embodiment.

In an example embodiment, a system can include a PFAM comprising an ISC PFAM portion and a VCS PFAM portion. Referring to FIG. 3B, a system 320 can include an ISC 322 coupled to an ISC controller 324. An ISC PFAM portion in the form of an IPFAM module 326 can be installed at the ISC controller 324 and be executable thereon. The system 320 can include a VCS 330 having a VCS controller 332, with a VCS PFAM (VPFAM) module 334 installed and executable thereon. A user input means 328 can be configured to provide user input to the VPFAM module 334.

In an example embodiment the VPFAM 334 can be embodied as a software module and be configured to receive input regarding a variety of vehicle system and apparatus states via the VCS controller 332. For example, the VCS controller 332 can be configured to receive vehicle speed information from the vehicle speed sensor 212 and provide it to the VPFAM 334. The VPFAM 334 can be configured to provide vehicle state input for the IPFAM 326, for example via the communicative coupling of the VCS controller 332 and the ISC controller 324. Thus, the VPFAM 334 and IPFAM 326 can cooperate to determine at least one parameter of the PWM practiced at the ISC 322.

Figure 4:
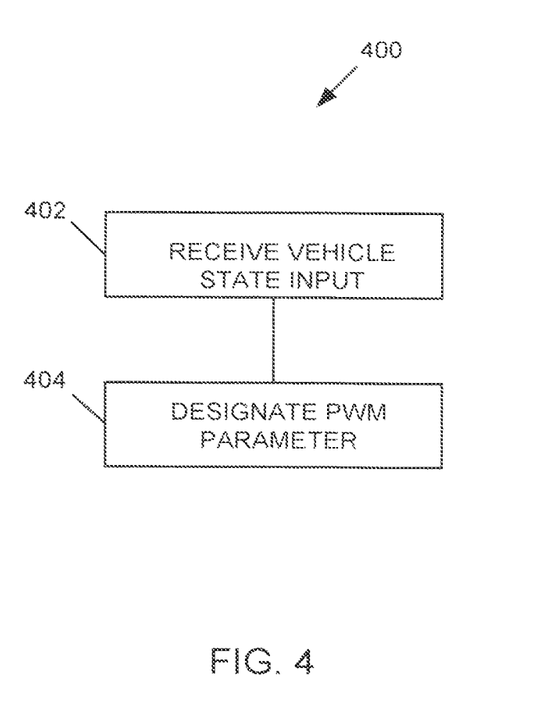
FIG. 4 shows a flow diagram of an example method of the invention.
Figure 5:
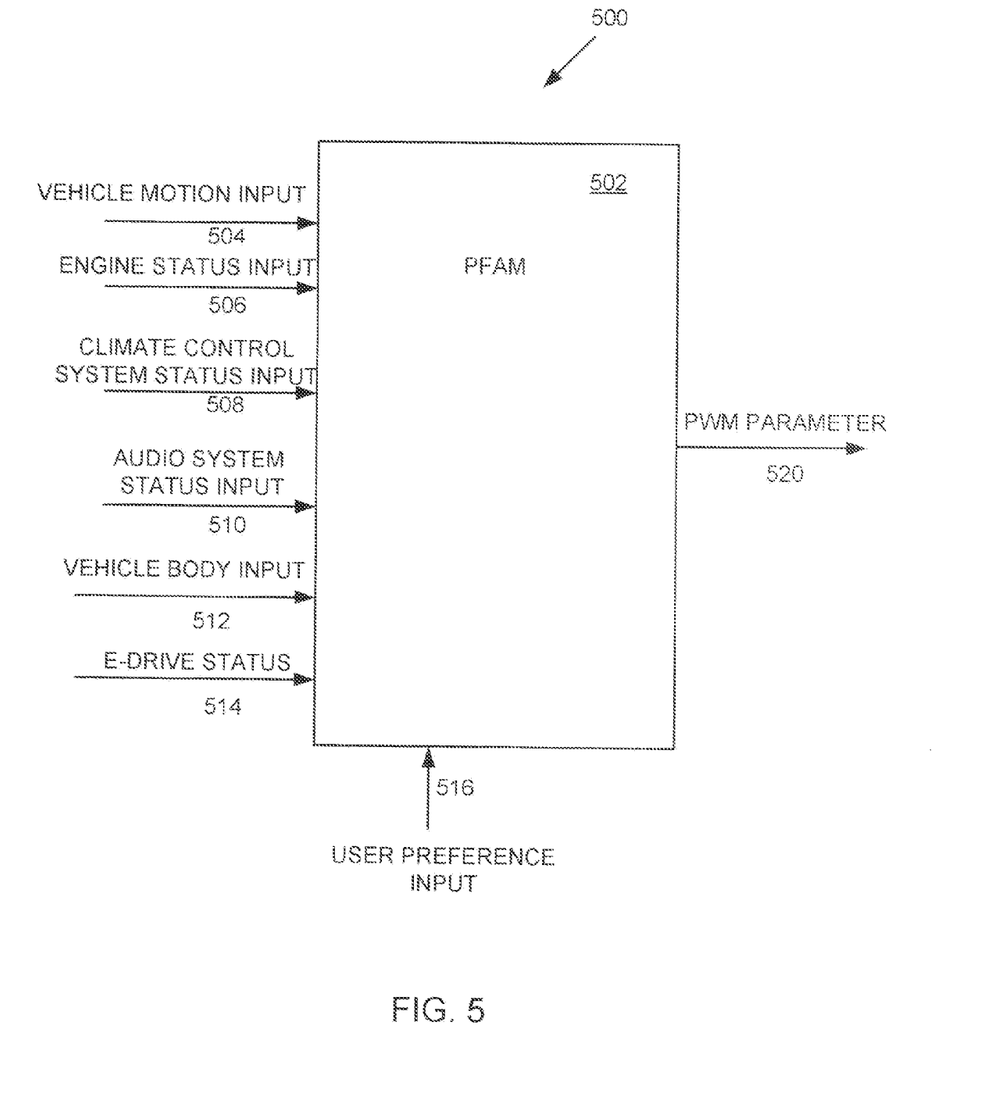
FIG. 5 depicts a block diagram of an example apparatus.

FIG. 4 depicts a flow diagram of an example method 400. At block 402 vehicle state input can be received at a PFAM. Referring to FIG. 5, an example PFAM 500 can receive vehicle state inputs 504-512 and provide an output 520. In an exemplary embodiment, the various inputs 504-512 are related to potential noise sources that can be heard by a vehicle occupant. In at least one example, input to the PFAM 502 can include input 504 pertaining to vehicle motion, input 506 pertaining to vehicle engine state, input 508 pertaining to vehicle climate control system state, input 510 pertaining to vehicle audio system state, input 512 pertaining to vehicle window state, and input 514 pertaining to EDS state. In an example embodiment, a VCS provides the inputs 504-512 to the PFAM 502, while input 514 can be received from a sensor within the EDS 120. Typically, a VCS can obtain the vehicle state data expressed in the inputs 504-512 from the various vehicle systems to which it is communicatively coupled, without requiring additional sensors or hardware.

The vehicle motion input 504 can comprise information characterizing the speed at which the vehicle is moving. For example, the VSC 150 can provide speed information from the speed sensor 212 to the PFAM 502. At the PFAM 502 vehicle speed may be characterized categorically as low speed or high speed, by other general categories, or by quantitative terms such as miles or kilometers per hour. At high speeds, engine noise and road noise typically increase and can be louder than the PWM related noise, shielding an operator from the sound of the PWM switching. However at low speeds, engine and road noise are typically lower, causing the PWM related noise to be more noticeable by an occupant, particularly a driver, since an ISC is typically located on the driver's side of a vehicle. In an example embodiment, vehicle motion input comprises vehicle shift input which can indicate whether a vehicle is in a drive mode. When a vehicle is in a drive mode, a noise reduction mode can be selected, while when the vehicle is not in a drive mode, a default mode may be selected.

The engine status input 506 can comprise information pertaining to a vehicle engine mode. An engine can operate in several different modes. In an example embodiment, when an engine is an OFF mode, a vehicle can be driven by an electric motor, necessitating PWM switching of inverter elements that can produce noise that a user may want to avoid. Furthermore, because the engine is in an OFF mode, it is not producing noise, so cannot mask the PWM switching noise. Thus, when an engine is in an OFF mode, a noise reduction mode can be selected. When a vehicle engine is in a cranking mode, engine-generated noise is typically high, and may mask PWM switching noise. Accordingly, a nominal or default PWM mode may be selected. When an engine is in an acceleration or deceleration mode, a noise-reduction mode is generally preferred.

Climate control system status input 508 can comprise information characterizing the operation of the vehicle heating/air conditioning system(s), another potential source of noise that may shield a driver from hearing PWM-related noise. In an example embodiment, climate control system status input 508 comprises data characterizing whether the vehicle air conditioner is turned on or is turned off. In a further example embodiment, the input 508 can comprise data characterizing climate control system fan speed, since a fan can operate to both heat and cool the car. By way of example, but not limitation, fan speed can be expressed in general categories or by specific speeds. Other ways to characterize operation or state of the climate control system will occur to those skilled in the art.

The audio system status input 510 can comprise information pertaining to the vehicle audio system, for example whether a source is providing an audio signal to a speaker. A vehicle audio system can include various audio/visual equipment such as a radio, compact disc player, mp3 player, video player, and the like which can provide audio signals to one or more speakers mounted in the vehicle. The audio projected by the speakers, if sufficiently loud, can hide the noise produced by PWM switching operations. As an example, audio system input can include current operational status of a vehicle radio.

In an example embodiment, audio system state input can comprise a volume setting for the speakers of the audio system, which can be used with various components of a vehicle's audio/visual system. Typically a single volume control, such as the volume control knob of a radio, can control speaker volume for a set of one or more speakers. However, when this is not the case, for example when a built-in video player has a separate volume control, or when rear seat passengers have a separate volume control, audio state input 308 can comprise more than one volume setting. In addition to a volume setting, audio system input 510 can include whether an audio or audio/visual player is actually providing an audio signal. For example, a CD player may be turned on and a volume control knob turned up, but there may be no CD present, so the CD player would not be producing sound.

A lowered window on a vehicle can also be considered a source of noise for those riding in the automobile. In addition to generating its own "road noise", an open window can expose an occupant to various sounds and noises outside the vehicle. Window status input 512 includes information pertaining to whether one or more vehicle windows is lowered; i.e. whether at least one window is open. In an example embodiment, window status input 512 can include the degree to which a window is open and/or identify the open window. For example, a small vent window open in the rear of a van may cause less driver distracting noise than a driver's window that is completely lowered.

In an example embodiment, EDS state input 514 can comprise information that indicates whether an EDS is fully loaded. By way of example, but not limitation, input 514 can comprise temperature data from a sensor positioned at the EDS, for example within the ISO 123 or at the PMSM 126. A high temperature reading can indicate that the EDS 120 is fully loaded, in which case power requirements and/or losses can be considered in selection of a PWM parameter.

Using the inputs 504-514, the PFAM 502 can determine a PWM parameter at block 404. A PWM parameter can be any attribute that characterizes or quantifies PWM performance. For example, a PWM parameter can comprise a PWM switching frequency, a PWM strategy, or both. By way of example, but not limitation, a PWM strategy can comprise a continuous, non-continuous, or random strategy. In the past, PWM frequency has been selected on the basis of motor state or torque requirement. The present invention provides systems and methods for designating a PWM frequency based on vehicle state information. In an example embodiment, a PWM frequency can be selected that reduces noise while optimizing ISO and vehicle performance. For example, based on vehicle state input that indicate that a set of particular conditions are in effect, a PWM frequency of 7.5 kHz-10.0 kHz can be selected over a default switching frequency of 1.25 kHz-5.0 kHz. In an example embodiment, a PWM strategy can be designated that optimizes performance, whether a high or low PWM switching frequency is specified.

The invention provides a method and system in which vehicle state information can be used to determine whether PWM is performed in a noise-reduction mode or in a default mode. In an example embodiment, when a noise reduction mode is selected, a PFAM provides one or more PWM parameters that can reduce PWM switching noise heard by a driver. By way of example, but not limitation, when a default mode is selected, pulse width modulation is performed without consideration of PWM noise effects. For example, PWM parameters can be specified on the basis of fuel economy.

Figure 6:
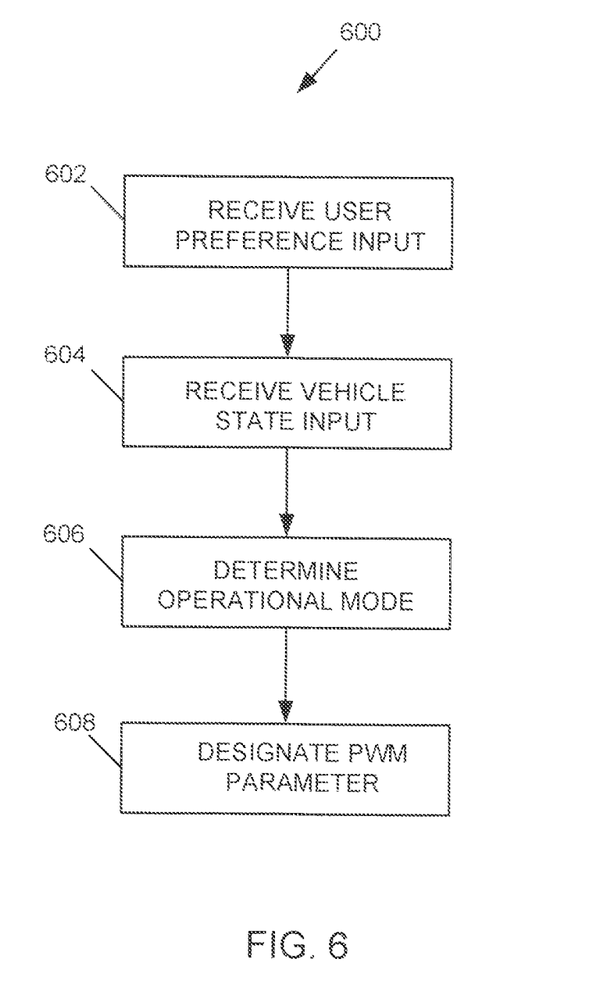
FIG. 6 depicts a flow diagram of an example method.

FIG. 6 depicts a flow diagram of an example method 600. At block 602 a PFAM can receive user input. For example, the PFAM 502 can receive user preference input 516. Referring to FIGS. 3A and 5, user input 516 can be received via user input means 308 and provided to the PFAM 304. In an example embodiment, the user input means 308 is in the form of a button or switch, or other hardware mechanism that can be manipulated by a driver to indicate a desire for PWM noise reduction. As a further example, user input can be programmed, eliminating the need for a hardware input means, and user preference can be stored in software, either at the PFAM 304, or at another software module in communication with PFAM 304. For example, a user preference can be programmed in the VCS controller 332 or at a dashboard information center. In an example embodiment, the user preference input 516 comprises an operational mode preference of a driver; for example, whether a noise reduction mode or a default mode is preferred. Some drivers may pay little or no regard to PWM-related noise, and may actually prefer to hear it. Other drivers may find the PWM noise very irritating.

At block 606, a PFAM can designate a PWM operational mode based on user preference and vehicle state inputs. For example, the PFAM 304 can perform an algorithm using the user preference and vehicle state inputs to determine whether pulse width modulation at an ISC should be performed in a noise reduction mode or in a default mode. In an example embodiment, if a user prefers a default mode, a default mode is selected at the PFAM 304.

A noise-reduction mode and default mode can be variably defined. In at least one example, a default mode can be characterized by a default switching frequency and/or default PWM strategy, and a noise-reduction mode can be defined as one in which the PWM switching frequency and/or strategy are different from those of the default mode. As a further example, a default mode can be one in which a PWM switching frequency of 5.0 kHz or less is specified by a PFAM, while a noise-reduction mode can be one in which a PWM switching frequency greater than 7.5 kHz is designated. Alternatively, in a default mode a PWM switching frequency within the audible band can be employed, while in a noise-reduction mode a PWM switching frequency outside the audible band can be employed. As a further example, a default mode can include a first set of PWM frequencies and strategies, while a noise-reduction mode can include a different set of PWM frequencies and strategies. Other ways of distinguishing a default mode from a noise-reduction mode will occur to those skilled in the art. By way of example, but not limitation, when a default mode is not preferred by a user or selected by a PFAM, a PWM parameter can be selected that reduces noise or reduces power losses.

At block 608, at least one PWM parameter is specified in accordance with the selected operational mode. For example, if, based on the received inputs 504-514, a noise reduction mode is designated, the output 330 can comprise a PWM parameter that can reduce the noise generated during PWM switching. For example, the output 330 can comprise a high PWM switching frequency which is less audible than a lower default switching frequency. Likewise, the output 330 can comprise a PWM strategy, such as random frequency hopping about a specified frequency (whether high or low) that can reduce the noise perceived by an operator. In an example embodiment, the PWM parameter can be provided to an ISO controller that controls ISO operation. For example, the PFAM 212 can designate a PWM strategy and provide it to the ISO controller 210 so that the ISO 216 can implement the designated PWM strategy.

Figure 7:
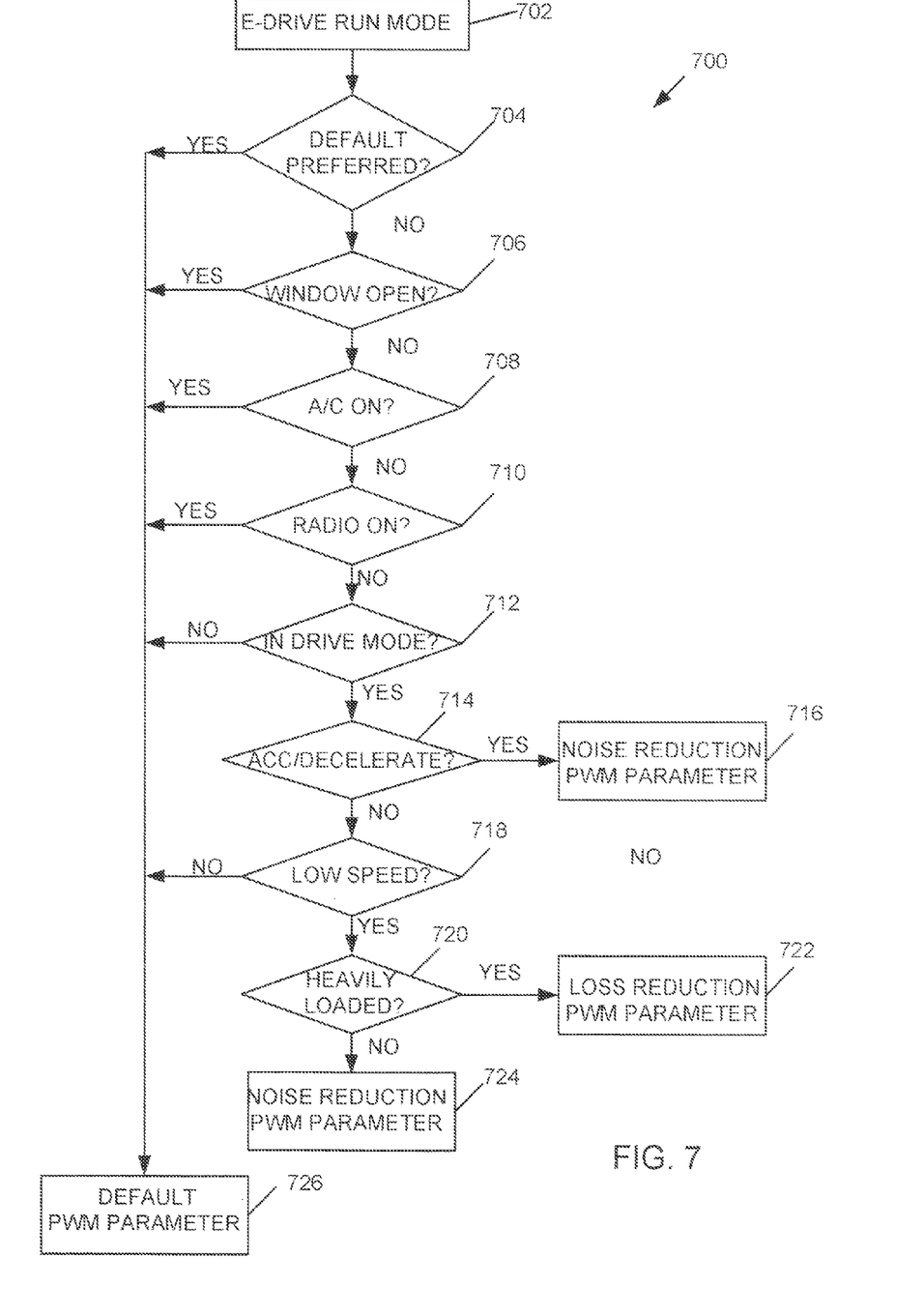
FIG. 7 shows a flow diagram of an example method.

FIG. 7 shows an example method 700. At block 702, an electric drive run mode is entered. At decision block 704 a determination is made as to whether a user prefers a default mode. In an example embodiment, a user can select a preferred operational mode via user input means 328 which can provide the user preference to the IPFAM 326. By way of example, but not limitation, active selection of a default mode and/or failure of a user to designate a preferred mode other than a default mode, results in selection of a default mode in which a default PWM parameter is selected at block 726. For example, the IPFAM 326 output can comprise a predetermined default PWM strategy. In an example embodiment, the IPFAM 326 can provide the default PWM strategy to the ISC controller 324 so that the default strategy can be implemented at the ISC 322.

If a default mode is not selected, for example a user indicates a preference for a noise-reduction mode, the method 700 continues with decision blocks pertaining to the state of various vehicle systems or components. Preferably, vehicle state input comprises status information for vehicle components other than a vehicle motor. In an example embodiment, when vehicle state information indicates the presence of noise from another source, a default PWM parameter is selected. However, if the user selects a noise-reduction mode, and vehicle state input indicates an absence of other noise, a noise-reduction PWM parameter, rather than a default PWM parameter can be selected.

For example, at decision block 706 a determination is made as to whether a vehicle window is open. As an example, from the VCS controller 310 the PFAM 304 can receive ventilation state input 508 which can include data regarding the state of the vehicle windows. If at least one window is open, the PFAM 304 can designate a default PWM parameter as output at block 726. If no window is open, the example method 700 can proceed to decision block 708 in which a determination is made as to whether the vehicle air conditioner is turned on. For example, the PFAM 125 can receive ventilation system input 508 which can be in the form of information conveying whether the air conditioner is turned on. Because an operating air conditioner can produce fan noise that can mask PWM switching noise, a determination that the air conditioner is on can lead to block 730 at which a default PWM parameter is specified. Pulse width modulation characterized by the default PWM parameter can be performed at the ISC 123.

If the air conditioner is not on, the method 700 can proceed to block 710 where a determination can be made as to whether the vehicle radio is on. For example, audio system input 510, which can be obtained by the VCSM 202 and provided to the PFAM 304, can comprise information regarding whether a vehicle radio is turned on. If the radio is turned on, the example method 700 can proceed to block 726 at which a default PWM parameter is selected.

If the radio is not turned on, the method 700 can continue to decision block 712 at which a determination is made as to whether the vehicle is in a drive mode. In an example embodiment, this determination is made based on vehicle shift input provided to a PFAM; for example, vehicle motion input 504 can comprise vehicle shift input. If the vehicle is not in drive mode, the method 700 can proceed to block 726 at which a default PWM parameter is specified.

If the vehicle is in drive mode, the method can continue to a decision block 714, at which a determination is made as to whether the vehicle is accelerating or decelerating. The noise due to PWM switching can be more pronounced during periods of acceleration or deceleration; therefore it is generally desirable to select a noise reduction mode during these periods. Accordingly, the method 700 can continue to block 716, at which a noise reduction PWM parameter is selected. By way of example, a noise reduction PWM parameter can comprise a high PWM switching frequency. Also by example, a noise reduction PWM parameter can comprise a PWM strategy performed using a high PWM switching frequency. A high frequency can be variably defined. For example, it can be any frequency higher than the frequency used for the default frequency at block 726. It can also be defined as a frequency greater than a predetermined threshold, or a frequency within a predetermined frequency range. Preferably a high PWM frequency is higher than the band of frequencies audible to the human ear. In an example embodiment, a high frequency can be a frequency higher than 7.5 kHz. In an example embodiment, a PFAM includes a look-up table of low and high frequencies from which a PWM switching frequency can be selected. A PWM strategy using the designated high frequency can then be performed at the ISO 123. As an example, a random PWM strategy using a high frequency can be practiced.

If the vehicle is moving at a constant speed, i.e. neither accelerating or decelerating, the method can continue to block 718 at which a determination is made as to whether the vehicle is moving at a low speed. Vehicle motion input 504 can comprise vehicle speed information that can be received from a vehicle speed sensor, for example vehicle speed sensor 212. By way of example, but not limitation, a high speed can be defined as a speed greater than a predetermined threshold. For example, a speed greater than 40 mph can be considered a high speed. At a high speed, the engine typically generates sufficient noise to mask the sound of PWM switching, so the method 700 can continue to block 726 when the vehicle is moving at a high speed. Alternatively, when a vehicle is moving at a low speed, the method 700 can continue to decision block 720 at which a determination is made as to whether the electric drive is heavily loaded. One indication that the electric drive is heavily loaded is that temperature inside an ISC and/or at a PMSM becomes high. For example, an ISC temperature around 110° C. can indicate that the electric drive is heavily loaded. In an example embodiment, the ISC controller 124 can monitor the temperature provided by a sensor within the ISC power stage and/or motor stator windings, and provide EDS state input 514 to the PFAM 502. By way of further example, the PFAM 502 can directly receive input 514 from a sensor within an EDS. When the electric drive is heavily loaded, use of a high PWM frequency could cause the ISC to overheat, therefore a loss-reduction PWM parameter can be selected at block 722, such as a low PWM frequency and/or a random PWM strategy. Although a lower frequency generally is less effective in reducing noise because a lower frequency may still be within the audible band of an occupant, the noise effects of a low PWM frequency can be mitigated by proper selection of a PWM strategy. For example employing a random frequency-hopping PWM strategy can spread the power spectrum over a range of lower frequencies, and thereby reduce the PWM-generated noise. If the electric drive is not heavily loaded, a noise-reduction PWM parameter, such as a noise reduction PWM frequency, for example a high PWM switching frequency, which provides better noise reduction, can be tolerated by the ISO and therefore can be selected at block 724.

Whether the designated PWM frequency is high or low, selection of a PWM parameter can include selection of a PWM strategy to be implemented at the ISO 123. As mentioned previously, a PWM strategy can include, but not be limited to, continuous PWM, non-continuous PWM or random PWM. Random PWM can be implemented by selecting a frequency at random from a look-up table. Alternatively, random PWM can be practiced by frequency hopping about the designated frequency to diffuse the power spectrum.

Example methods for using vehicle state input to designate one or more PWM parameters for pulse width modulation switching operations at an ISO are presented herein. The use of vehicle state input and/or user preference input to determine the characteristics of the pulse width modulation used at an electric drive system of a hybrid vehicle is in contrast to prior art methods that used motor speed and torque requirements as a basis for designating PWM switching frequencies, strategies or other PWM characteristics. Preferably, vehicle state input comprises information pertaining to potential noise sources at a vehicle, and user preference input comprises a user's desire for a noise-reduction mode. The various inputs can be used to select a PWM parameter that can reduce PWM related noise when desired by a user. Furthermore, methods of the invention can include efficiently entering noise-reduction modes under predetermined conditions, and operating in default modes otherwise, thereby reducing the losses incurred at high switching frequencies, unlike prior art systems that consistently employ high switching frequencies regardless of vehicle state or user preference.

Preferred embodiments rely on software to implement the methods, eliminating the need for additional or customized hardware. Flowcharts included herein represent control logic which may be implemented using hardware, software, or combination of hardware and software. The logic may be implemented using any of a number of known programming or processing techniques or strategies and is not limited to the order or sequence illustrated. Various functions may be performed in the sequence illustrated, at substantially the same time, or in a different sequence while accomplishing the features and advantages of the invention. The illustrated functions may be modified or in some cases omitted without departing from the spirit or scope of the present invention.

What is claimed:

1. A system comprising:
a pulse width modulation (PWM) frequency adaptation mechanism (PFAM) configured to receive user preference input pertaining to preference regarding provision of noise reduction during a vehicle electric drive running mode and vehicle state input, said vehicle state input comprising input pertaining to a current status of a vehicle or a component of said vehicle, and provide at least one PWM parameter;
a user input means configured to provide said user preference input to said PFAM;
wherein said vehicle component is other than an electric motor at said vehicle; and
wherein said PFAM is configured to provide a noise reduction mode in which said PWM parameter is configured to reduce audible noise during said vehicle's electric drive running mode.

2. The system of claim 1, further comprising a first microprocessor configured to interact with said PFAM and control a circuit in which elements are switched on and off by pulse width modulation characterized by said PWM parameter.

3. The system of claim 2, wherein said PFAM comprises software executable at said microprocessor.

4. The system of claim 2, wherein said PFAM comprises a first portion at said first microprocessor, and a second portion at a second microprocessor, said first and second portions configured to interact with each other, said second portion configured to provide said vehicle state input to said first portion.

5. The system of claim 1, wherein said PWM parameter comprises a PWM switching frequency.

6. The system of claim 1, wherein said PWM parameter comprises a PWM characteristic other than switching frequency.

7. The system of claim 6, wherein said PWM parameter comprises a PWM strategy identifying a type of PWM.

8. The PFAM of claim 7, wherein said PWM strategy comprises continuous PWM, discontinuous PWM, or random PWM.

9. A system comprising:
at least one digital processor;
a computer-readable medium operatively coupled to said at least one digital processor; having stored thereon logic for sequences of instructions for said digital processor, the sequences of instructions, when executed by said digital processor, cause the processor to determine at least one pulse width modulation (PWM) parameter based on received user input pertaining to preference regarding provision of noise reduction during an electric drive run mode of an electric vehicle, vehicle state input, wherein said vehicle state input is vehicle motion input, engine state input, vehicle body input, audio system state input, or climate control system state input; and
wherein a portion of said sequences of instructions is configured to cause said microprocessor to provide a noise reduction mode in which said PWM parameter is configured to reduce audible noise during said electric drive run mode at said vehicle.

10. The system of claim 9, wherein a portion of said sequences of instructions causes the processor to designate a PWM parameter comprising a PWM characteristic other than PWM frequency.

11. A method comprising:
receiving vehicle state input at a pulse width modulation (PWM) frequency adaption mechanism (PFAM) said vehicle state input related to a current status of a vehicle or vehicle component;
receiving user preference input at said PFAM regarding noise reduction performed during an electric drive run mode of said vehicle;
in response to said vehicle state input and said user preference input, said PFAM designating a pulse width modulation (PWM) parameter for PWM switching in a circuit configured to provide a voltage to an electric motor at said vehicle; wherein, in a noise reduction mode said PWM parameter is configured to reduce noise during an electric drive run mode of said vehicle; and
wherein said vehicle component is other than said electric motor.

12. The method of claim 11, wherein said PWM parameter comprises a PWM switching frequency or a PWM strategy.

13. The method of claim 11, further comprising selecting a noise reduction or a default PWM operational mode in response to said user preference input and said vehicle state input.

14. The method of claim 11, wherein said vehicle state input comprises input belonging to a group including vehicle motion input, vehicle body state input, climate control system state input, and audio system state input.

15. A pulse width modulation (PWM) frequency adaptation mechanism (PFAM), comprising:
a PWM parameter portion configured to designate at least one PWM parameter using vehicle state input and user preference input regarding noise reduction performed during an electric drive run mode of said vehicle;
a memory portion for storing one or more predetermined PWM parameters;
wherein said vehicle state input comprises input pertaining to a status of a said vehicle or said vehicle component other than an electric motor; and
wherein, in a noise reduction mode, said PWM parameter is configured to reduce audible noise during said vehicle's electric drive run mode.

16. The PFAM of claim 15, wherein said PWM parameter comprises a PWM frequency.

17. The PFAM of claim 15, wherein said vehicle state input comprises vehicle motion input, vehicle body state input, climate control system state input, engine state input or audio system state input.

18. The PFAM of claim 15, wherein said PFAM is configured to operate in a default mode.

19. The PFAM of claim 15 further comprising a vehicle state portion configured to receive vehicle data and provide a vehicle state to said PWM parameter portion.

20. The PFAM of claim 15, wherein said PWM parameter comprises a PWM characteristic other than PWM frequency.

* * * * *